UNITED STATES PATENT OFFICE.

CAMILLE PETRI, OF BUCHSWEILER, GERMANY.

PROCESS OF MAKING SODIUM FERROCYANID.

No. 798,208.     Specification of Letters Patent.     Patented Aug. 29, 1905.

Application filed February 29, 1904. Serial No. 195,909.

*To all whom it may concern:*

Be it known that I, CAMILLE PETRI, a subject of the German Emperor, residing at Buchsweiler, Lower Alsace, German Empire, have invented a new and useful Process of Manufacturing Sodium Ferrocyanid on an Industrial Scale, of which the following is a specification.

The manufacture of sodium ferrocyanid from a solution of calcium ferrocyanid, which is produced chiefly from the reagents employed in the purification of illuminating-gas, has heretofore been effected by two methods, either by precipitating the ferrocyanid in form of the well-known blue precipitate by means of iron salts and decomposing the blue product by means of sodium hydrate, whereby oxid of iron is eliminated, or by treatment with sodium carbonate, in which case carbonate of lime is precipitated as an insoluble deposit, sodium ferrocyanid alone remaining in solution. In both cases the solution of sodium ferrocyanid is separated from the precipitates, evaporated, and the salt is then obtained by crystallization.

In the manufacture of potassium ferrocyanid from calcium ferrocyanid the precipitation of the difficultly-soluble double salt

by the addition of chlorids of potash to the solution of calcium ferrocyanid makes it possible to introduce half of the potash into the molecule by means of the chlorid of potash formed

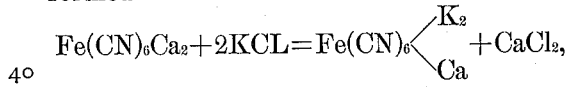

(German patent No. 26,884, of July 6, 1883, Kunheim and Zimmerman.) The chlorid of calcium formed by this reaction remains in solution and may be separated from the precipitated double salt. In contradistinction from the potassium salt, the utilization of the cheap sodium chlorid instead of caustic soda or carbonate of sodium did not suggest itself in the case of sodium ferrocyanid, as hitherto the formation of a difficultly-soluble double salt of calcium ferrocyanid could not be observed. As such a double salt could not even be formed by adding sodium chlorid, the separation of the products of reaction was not thought to be possible. It has now been ascertained that the sodium ferrocyanid, which is formed by the addition of sodium chlorids to a solution of calcium ferrocyanid according to the formula $$Fe(CN)_6Ca_2 + 4NaCl = Fe(CN)_6Na_4 + 2CaCl_2,$$

admits a ready separation from the simultaneously-produced chlorid of calcium. The sodium ferrocyanid thus formed may be obtained from the solution by crystallization as well as by separation in concentrating the same, while the simultaneously-formed chlorid of calcium remains in solution in view of its being considerably more soluble at any temperature, so that it may be easily separated from the sodium ferrocyanid. It may be stated that the above effect is obtained without the use of sodium carbonate in conjunction with sodium chlorid. The production and the separation of the sodium ferrocyanid takes place very easily from that reason also, because it has been ascertained that there is no subsequent decomposition of the sodium ferrocyanid upon evaporating the solution. It has further been ascertained that such a complete separation of the sodium ferrocyanid from the simultaneously-formed chlorid of calcium is rendered possible, that the process can be carried out on a large scale industrially with considerable advantage, because under the circumstances prevailing with this process, a difficultly-soluble double salt of calcium and sodium ferrocyanid is formed. The main body of sodium ferrocyanid is separated as such from the solution of calcium ferrocyanid. After this has been done a muddy salt is separated by crystallization in case the solution is further concentrated. This salt is a hitherto unknown double salt of the following formula:

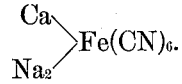

This double salt is difficultly soluble in a concentrated solution of chlorid of calcium and is unchangeable in the presence of such a solution, formed in the present process by crystallizing the sodium ferrocyanid from the solution. Said double salt, however, is readily soluble and changeable in water, thereby forming calcium ferrocyanid and sodium ferrocyanid. Consequently it is possible to produce from the above-mentioned double salt by crystallization sodium ferrocyanid and a mother-lye containing in the main calcium ferrocyanid, which lye may be used in addition to the first lye of calcium ferrocyanid. It may be further stated that by adding chlorid of sodium while dissolving the double salt a larger quantity of sodium ferrocyanid will be separated by crystallization. The remaining mother-lye may also be worked up with the first mother-lye. From the foregoing it may be seen that it is possible to almost entirely separate combinations of ferrocyanid from the solution of chlorid of calcium, so that the process is rendered perfect. According to the concentration of the solution the sodium ferrocyanid crystallizes from the solution both at ordinary temperature as well as at a temperature considerably below zero. After the solution of calcium ferrocyanid has been suitably concentrated a corresponding proportion of the sodium ferrocyanid precipitates directly upon the addition of sodium chlorid. The separation by concentrating the solution may be effected at any temperature, both at the boiling temperature and under ordinary pressure, as well as at lower temperature, by evaporation or by boiling under reduced pressure *in vacuo*. The small percentage of ferrocyanid of sodium, which by the final operation cannot be separated from the solution, is preferably obtained by precipitation by means of chlorid of potash, for instance. Thus the process herein described, as distinguished from the old process, allows of introducing the entire amount of sodium into the molecule in place of the expensive carbonate of sodium and by means of the cheap chlorid of sodium. Furthermore, the entire costs of manufacture are reduced, inasmuch as in the old process the sodium ferrocyanid had to be obtained from a bulky precipitate of carbonate of calcium by means of washing the same with a great amount of wash-water which required subsequent concentration, while in the present process the chlorid of calcium which remains in solution can be easily separated from the solid crystals of sodium ferrocyanid by means of a centrifugal machine.

What I claim, and desire to secure by Letters Patent of the United States, is—

The process for manufacturing sodium ferrocyanid without the use of sodium carbonate, which consists in adding a suitable quantity of chlorid of sodium to a solution of calcium ferrocyanid and separating the sodium ferrocyanid formed from the thus obtained solution, substantially as specified.

In witness whereof I have hereunto signed my name in the presence of two subscribing witnesses.

CAMILLE PETRI.

Witnesses:
  RICUER,
  GUSTAV SCHWEISS.